(12) United States Patent
Slocum et al.

(10) Patent No.: US 7,004,235 B1
(45) Date of Patent: Feb. 28, 2006

(54) METHOD OF PROVIDING DIRECT IMPINGEMENT TEMPERATURE CONTROL OF A DEVICE

(75) Inventors: Alexander H. Slocum, Bow, NH (US); Andreas C. Pfahnl, Goffstown, NH (US)

(73) Assignee: Teradyne, Inc., Boston, MA (US)

( * ) Notice: Subject to any disclaimer, the term of this patent is extended or adjusted under 35 U.S.C. 154(b) by 0 days.

(21) Appl. No.: 10/345,846

(22) Filed: Jan. 16, 2003

Related U.S. Application Data

(62) Division of application No. 09/415,886, filed on Oct. 8, 1999, now abandoned.

(51) Int. Cl.
*F25B 29/00* (2006.01)
*H01S 3/04* (2006.01)

(52) U.S. Cl. .......................................... 165/61; 372/35
(58) Field of Classification Search ................ 165/201, 165/61; 372/34, 35
See application file for complete search history.

(56) References Cited

U.S. PATENT DOCUMENTS

| | | | | |
|---|---|---|---|---|
| 3,285,329 A | * | 11/1966 | Finn ............................. | 165/61 |
| 3,708,223 A | * | 1/1973 | Sorensen et al. .......... | 165/61 X |
| 3,817,800 A | * | 6/1974 | Dunn, III et al. .......... | 165/61 X |
| 3,909,118 A | * | 9/1975 | Schmidt | |
| 4,000,392 A | | 12/1976 | Banas et al. | |
| 4,926,118 A | | 5/1990 | O'Connor et al. | |
| 4,959,245 A | | 9/1990 | Dobson et al. | |
| 5,307,011 A | | 4/1994 | Tani | |
| 5,311,528 A | * | 5/1994 | Fujino ......................... | 372/34 |
| 5,315,240 A | | 5/1994 | Jones | |
| 5,420,521 A | | 5/1995 | Jones | |
| 5,422,899 A | * | 6/1995 | Freiberg et al. ............ | 372/35 |
| 5,821,505 A | | 10/1998 | Tustaniwskyj et al. | |
| 5,844,208 A | | 12/1998 | Tustaniwskyj et al. | |
| 5,846,375 A | | 12/1998 | Gilchrist et al. | |
| 5,847,293 A | | 12/1998 | Jones | |
| 5,847,366 A | | 12/1998 | Grunfeld | |
| 5,859,540 A | | 1/1999 | Fukumoto | |
| 6,204,473 B1 | | 3/2001 | Legge | |
| 6,600,763 B1 | * | 7/2003 | Ludewigt ..................... | 372/35 |

OTHER PUBLICATIONS

Tustaniwyskj et al.: "Constant Temperature Control of a Device Under Test (DUT)—Part 1;" EEP vol. 19-2, Advances is Electronic Packaging—1987; vol. 2; ASME 1997; pp. 2031-2036.

* cited by examiner

*Primary Examiner*—Ljiljana Ciric
(74) *Attorney, Agent, or Firm*—Daly, Crowley, Mofford & Durkee, LLP

(57) ABSTRACT

A method for controlling the temperature of a device is described. The method includes providing a body having a heating/cooling region to which the device is exposed, heating the device with a heating channel provided in the body with one end exposed to the heating/cooling region and cooling the device with cooling channel provided in the body with one end exposed to the heating/cooling region. The heating and cooling channels are provided in the body such that energy propagating in the heating channel is intermingled with gas propagating in the cooling channel and the heating and cooling sources directly impinge upon the device in the heating region.

12 Claims, 2 Drawing Sheets

METHOD OF PROVIDING DIRECT IMPINGEMENT TEMPERATURE CONTROL OF A DEVICE

RELATED APPLICATIONS

This application is a divisional application of U.S. application Ser. No. 09/415,886, filed Oct. 8, 1999, now abandoned.

GOVERNMENT RIGHTS

Not applicable.

FIELD OF THE INVENTION

The present invention relates to temperature control systems and more particularly to structures for locating, holding, and controlling the temperature of a device.

BACKGROUND OF THE INVENTION

As is known in the art, many semiconductor and biological devices require rapid and precise temperature control during processing and testing. To provide such control, the device is typically disposed in a temperature control structure. The temperature control structure regulates the temperature of the device.

Devices, such as integrated circuits, have become increasingly smaller while at the same time the devices dissipate increasingly more power. This results in devices having a relatively low thermal mass which tend to rapidly heat during operation.

Temperature control structures, on the other hand, do not typically have a low thermal mass since the structures must include a heating apparatus and a heat sink. U.S. Pat. No. 5,821,505, for example, describes a typical temperature control structure which utilizes an electric blanket-type heater having first and second opposing faces. A heat sink makes contact with a first face of the electric heater and an electronic device under test makes contact with the second face of the electric heater. This approach results in a built-up, layered serial component structure in which the heater is disposed between the electronic device under test and the heat sink.

A temperature sensor is coupled to the electronic device and a control circuit is coupled to the temperature sensor and to the heater. The temperature sensor senses the device temperature $T_d$ and the control circuit decreases the power to the heater when the sensed temperature of the electronic device is above a set point, and vice-versa. When the heater temperature $T_h$ is less than the device temperature $T_d$, then heat flows from the electronic device through the heater to the heat sink and the rate of heat flow increases as $T_d-T_h$ increases. When $T_h$ is greater than $T_d$, then heat flows to the electronic device from the heater; and the rate of heat flow increases as $T_h-T_d$ increases. By electrically controlling just the heat power, heat flow to from the electronic device can be adjusted and that in turn regulates the device temperature.

Since the devices being heated and cooled have relatively low thermal mass and the temperature control structure on which the devices are disposed for processing and/or testing have many times the thermal mass of the device, the device itself does not greatly effect the thermal dynamics of the system. Instead, the thermal dynamics of the system are dominated by the temperature control structure. Thus, the principal task in maintaining a device at a particular temperature is to servo control the temperature of the temperature control structure on which the device is disposed.

As a consequence of the thermal mass of the temperature control structure being much greater than the thermal mass of the device, there is a delay in the thermal response time in controlling the temperature of the device. Furthermore, since the temperature control structure is many times the thermal mass of the device itself, significant energy is wasted in heating and/or cooling a low thermal mass device by using a high thermal mass temperature control structure.

Further, if the heater is provided as the type which includes an electrical trace separated from surroundings by a layer of dielectric material on each side, another problem with this layered component approach is that the dielectric layers of the heater represent a thermal resistance between the metal heating element and the electrical device and heat sink. Also the dielectric layers of the heating element are repeatedly heated and cooled and thus repeatedly expand and contract. These regions thus represent areas of potential mechanical failure due to the repeated expansion and contraction of the dielectric due to temperature changes.

It would, therefore, be desirable to provide a temperature control structure and system having a relatively low thermal mass which allows the temperature of a device to be rapidly changed. It would also be desirable to provide a system which provides fast thermal response, but good temperature stability once a desired temperature is reached. It would be further desirable to provide a compact temperature control structure which can be utilized in a relatively small test chamber and which allows good electrical contact to be made to a device under test and which can be used to in an environment in which a plurality of devices can be tested simultaneously.

SUMMARY OF THE INVENTION

One object of this invention is to provide a structure for temperature controlling a device that is in contact with it using direct impinging coolant jets and laser beams.

A further object of the invention is to align one or more laser beams coaxially with one or more expanding gas cooling jets, such that the laser beams and the cooling jets impinge on substantially the same region of the device.

A further object of the invention is to provide a system in which the heating and cooling effects occur directly on a surface of a device, and which has an effective heat transfer coefficient which is relatively high compared with effective heat transfer coefficients which can be obtained by mechanical contact between a device and a temperature controlled surface.

A still further object of the invention is to provide a vacuum structure to enable a device to be vacuum held firmly on a structure which controls the temperature of the device.

A still further object of the invention is to provide a temperature control structure which includes guiding and locating structures to help guide and locate a device to a seating surface of the temperature control structure, where the guiding and locating structure is also an insulator having a relatively light weight.

These and other objects of the invention are met by providing a structure for temperature controlling a device which includes a body having a heating/cooling region to which the device is exposed, a heating channel disposed in the body with one end exposed to the heating/cooling region and a cooling channel disposed in the body with one end exposed to the heating/cooling region and wherein the heating and cooling channels are disposed in the body such that energy propagating in the heating channel is intermingled with gas propagating in the cooling channel such that the heating energy and cooling gas directly impinge upon a surface the device. With this particular arrangement, a structure for controlling the temperature of a device is provided. The heating channel can be provided as an optically clear channel and the heating source can be provided as a laser source which produces laser light that passes through the optically clear channel and impinges directly on the device. The cooling channel can be provided as a gas channel and a cooling source can be provided as a gas source which provides pressurized gas through the gas channel. The gas enters the heating/cooling region through a nozzle structure which causes the gas to form a jet stream. When the gas jet stream exits the nozzle, the gas rapidly expands. The gas thus provides a cooling action generated by the rapidly expanding gas flow through the gas channel that then directly impinges upon the device. The laser light and gas are focused on substantially the same regions of the device such that the impingement zones of the heating and cooling sources are intermingled. In a preferred embodiment, the gas jet stream is centrally located in the heating source (e.g. the laser light) and thus the heating and cooling streams can be considered as coaxial streams. Since the heating and cooling sources directly impinge on the device, the system mass and thermal response times of the temperature control system are minimized. The technique of the present invention eliminates entirely any heater-to-heat sink thermal resistance necessarily included in prior art systems by combining the heater and heat sink into, effectively, one intermingled source. Depending upon the particular system in which the temperature control structure is used and the operating requirements of the system, millisecond thermal response times are possible. Furthermore, since the heating and cooling sources directly impinge on the device itself, the temperature control structure in which the device is held need not perform a heat sink function. Consequently, the temperature control structure can be fabricated from any material having a relatively low mass. Thus, the mass of the temperature control structure can actually be less than the mass of the device.

It should be noted that rapid precision temperature control can be used in a variety of applications including but not limited to semiconductor processing, printed circuit board manufacturing and chemical processing. Since chemical reactions are relatively sensitive to changes in temperature and temperature rate, in some embodiments, the device disposed in the temperature control structure could be a combinatorial chemistry chip, which contains different experiments.

The temperature control structure can further include a tube projecting through the body and into the heating/cooling region. A first end of the tube ends below the seating surface and a second end of the tube is adapted to be coupled to a vacuum source. When a vacuum is drawn through the tube, a vacuum force is generated to hold the device onto the seating surface. Also, by providing the top surface of the vacuum tube slightly below elevation of the seating surface, the vacuum tube acts as a drain to the expanding cooling gasses which enter the heating/cooling region via the gas channel.

Furthermore, the temperature control structure can include a guiding structure for accurately guiding a device into a particular location onto a seating surface of the temperature control structure. In a preferred embodiment, the guiding structure is provided from one or more tapered upper surfaces of the body which terminate on the seating surface of the temperature control structure. Thus, the temperature control structure of the present invention can include both locating and vacuum clamping structures, to locate and hold a device that is to be temperature controlled during testing and/or processing.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
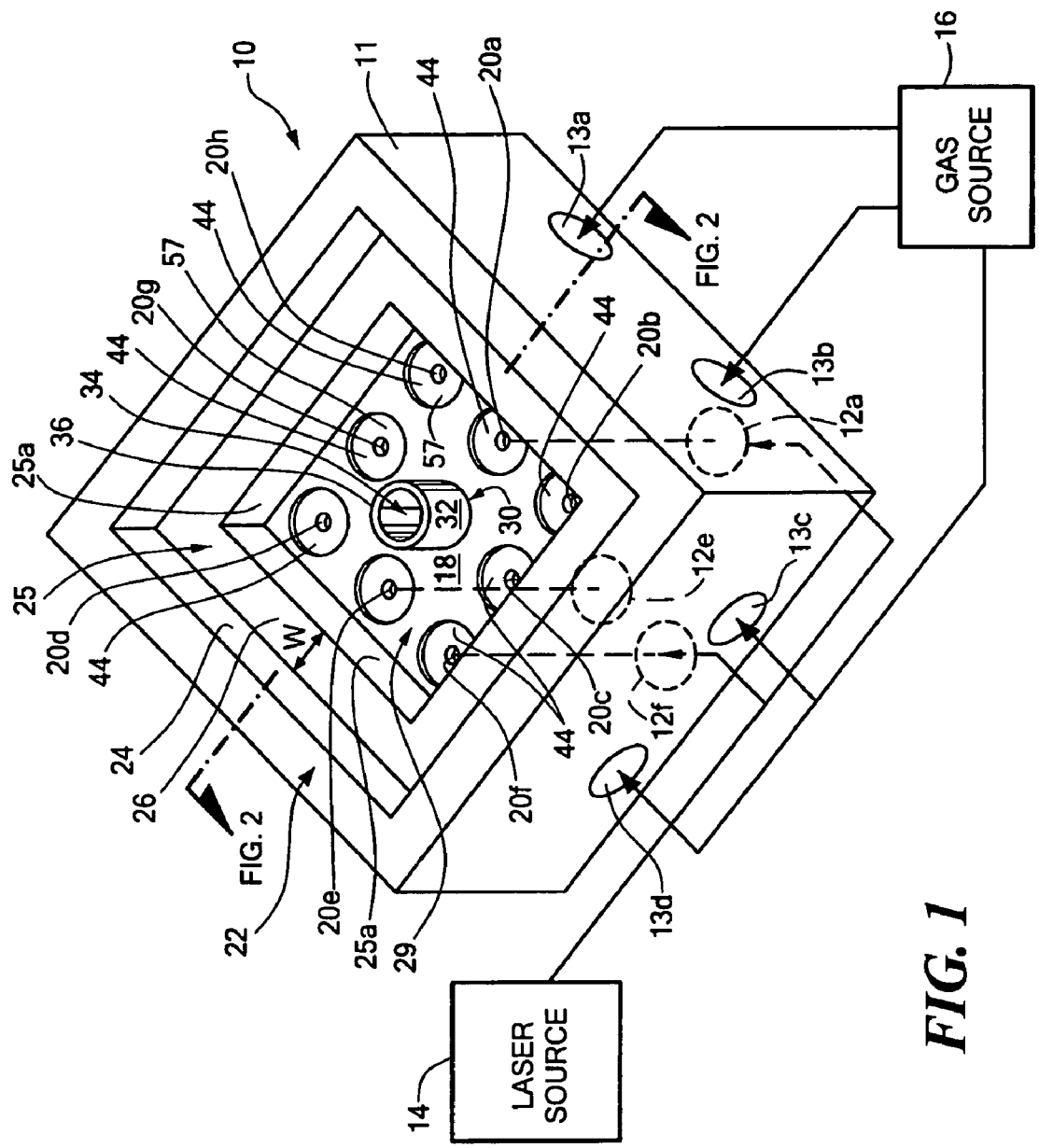
FIG. 1 shows an isometric view of a temperature control system.

Referring now to FIG. 1 a temperature control system 10 for controlling the temperature of a device includes a temperature control structure 12 having a plurality of laser ports 12a–12h provided in a bottom surface thereof and a plurality of gas ports 13a–13d provided in one or more side surfaces thereof. For clarity in viewing and explanation, only three of the laser ports 12a, 12e and 12f are shown in FIG. 1. A laser source 14 is coupled to each of the laser beam ports 12a–12h and a gas source 16 is coupled to each of the gas ports 13a–13d. It should be noted that in some embodiments it may be preferable to replace laser source 14 with another type of energy producing device such as a device which produces a focused beam of energy.

The optically clear ports 13a–13d and gas ports 12a–12h lead, respectively, to optically clear and gas channels which will be described below in conjunction with FIG. 2. Suffice it here to say that the light source 14 and gas source 16 transmit light and gas into the structure 12 to heat and/or cool a device disposed in structure 12. The particular manner in which this is accomplished will also be described below in conjunction with FIG. 2.

The temperature control structure 12 includes a base 18 having a plurality of apertures 20a–20h, generally denoted 20 provided therein. It should be appreciated that although structure 12 is here shown having eight laser ports 12a–12h, four gas ports 13a–13d and eight apertures 20c–20h, the structure 12 can be provided having any number of laser ports 12a–12h, gas ports 13a–13d or apertures 20a–20h. The particular number of ports 12a–12h, 13a–13d and apertures 20a–20h used in any particular application is selected in accordance with a variety of factors including but not limited to available space, heating and cooling requirements.

Sidewalls 22 project above the base 18. The gas ports 13b are provided in the sidewalls 22 of the support structure 12 and lead to channels provided in the structure 12. Structure 12 may be manufactured from any material having sufficient strength to support a device disposed thereon during and having a relatively low thermal conduction characteristic. Structure 12 may be provided from materials including, but not limited to, plastic or porceline, for example. In some embodiments, it may be desirable or necessary to manufacture the entire structure from an optically transparent or clear material. In the particular embodiment shown in FIG. 1, the sidewalls 22 are provided having tapered upper surfaces 24 which end on a boss 25 having a side surface 25a and a top surface 26. The top surface 26 defines a seating surface 26.

As will be described below in conjunction with FIG. 2, the tapered sidewall surfaces 24 help precise and guide a device onto the seating surface 26. The seating surface 26 is provided having a width W selected such that a bottom surface of the device is flush on the seating surface 26. In one embodiment, a gasket or sealant material can be disposed on the seating surface 26 to improve the seal between the device and the surface 26. In some embodiments it might be preferable to provide the gasket from a conductive material, while in other embodiments, the gasket may be provided from a non-conductive material. The base 18 and the boss sides 25a define a heating/cooling region 29.

The structure 12 further includes a device retaining structure 30. In this particular embodiment, the retaining structure 30 is provided from a vacuum tube 32 having a vacuum hole 34 along a central longitudinal axis thereof. The vacuum tube 32 is disposed through the base 18 and projects a distance above the base 18 such that a top surface 36 of the vacuum tube is slightly below a surface of a device. In this particular embodiment, the top surface 36 is below a plane defined by the seating surface 26. With this approach, the vacuum hole 34 can hold the device to the seating surface 26 while at the same time acting as a drain to expanding/cooling gasses which enter the region 29 through apertures 20a–20h in a manner to be described below. Although the retaining structure 30 has here been described as a vacuum structure, those of ordinary skill in the art will appreciate that other retaining structures may also be used. It should be noted that, as shown in FIG. 2, the device is typically in contact with any array of electric probes which prevent a device under test from being blown off of control structure 12 due to the force of the impinging jet stream of gas. Those of ordinary skill in the art will appreciate of course, that other techniques or retaining structures such as clamps could also be used.

Also included in the base 18 are the ports 13a which lead to optically clear channels 40a–40h (FIG. 2) which extend into the structure 12. Each of the one or more channels 40a–40h have a first end which terminates at a corresponding one of the apertures 20a–20h in the heating/cooling region 29 of the structure 12. A second end of each of the channels 40a–40h terminates at a corresponding one of the ports 12a–12h each of which are adapted to accept a laser signal from the laser source 14. The laser source 14 provides a laser beam or light having a size and shape which preferably substantially fills but does not exceed the size and shape of the channels 40a–40h. For example, if channels 40a–40h are provided having a circular cross-sectional shape of a particular diameter, then laser source 14 preferably provides a laser beam having a circular cross-sectional shape having a diameter substantially the same as the diameter of the channels 40a–40h.

It should also be noted that each of the channels 40a–40h need not be provided having the same size and/or shape. For example, advantageous temperature control characteristics may be achieved in a particular application by providing channels 40a–40h having different sizes and/or shapes. In this case, the size and shape of each laser beam could be selected to substantially match the size and/or shape of the channels 40a–40h in which the laser beam will propagate.

The apertures 20 open onto a first surface of the base 18 in an optional recess region 44 of the base 18. Although the apertures 20 are here shown provided in a recess region, it should be appreciated that apertures could simply be made flush in the base 18 or apertures 20 could be provided in a structure (e.g. a post or other raised structure) which rises above the base 18. The recess region is not needed but the apertures do not need to be flush either. It should be noted that although the size and/or shapes of the apertures 20 are all shown to be the same in FIG. 1, the size and shape of each of the apertures need not be the same.

Figure 2:
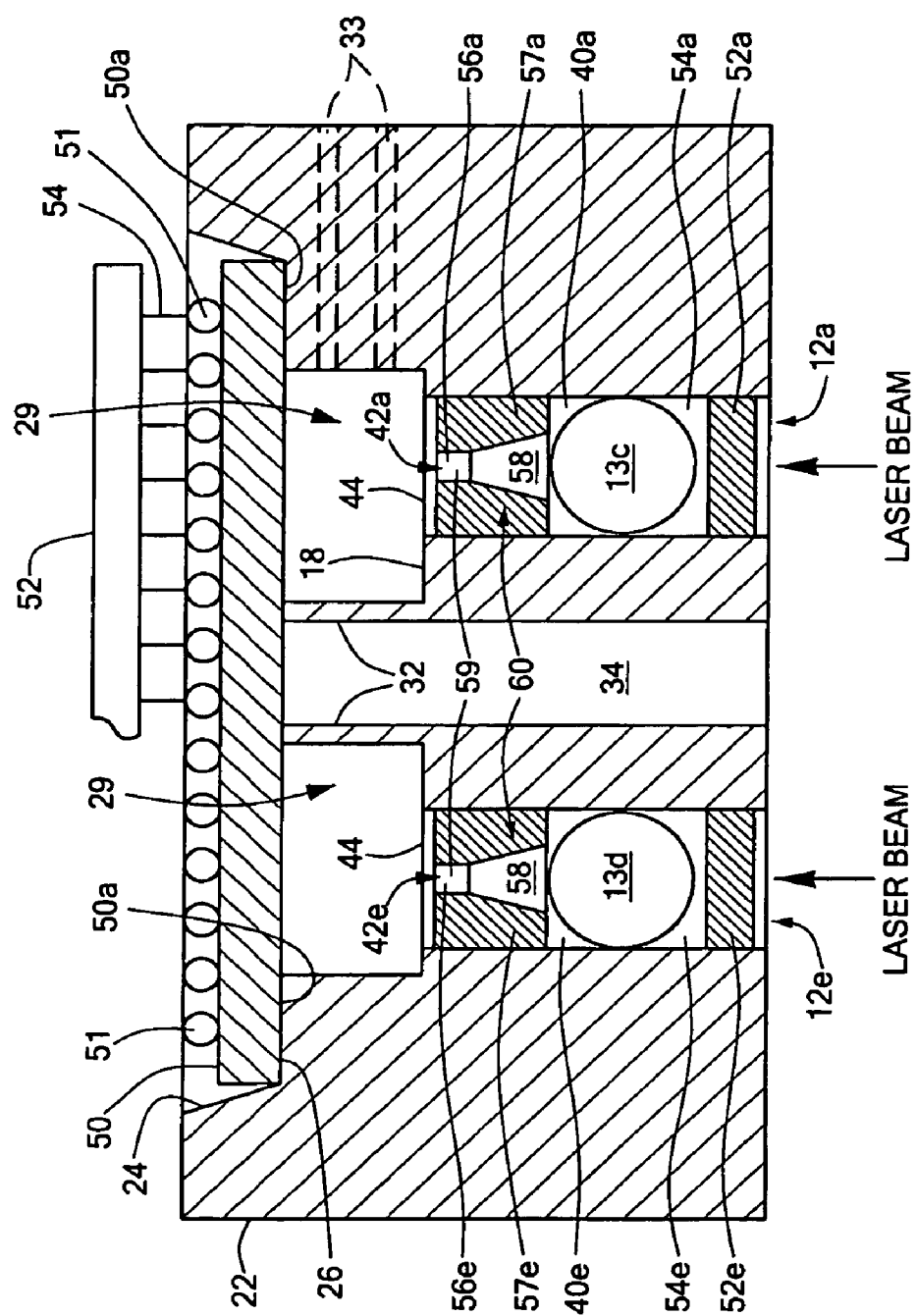
FIG. 2 shows a cross section of the temperature control structure having a device disposed thereon taken along lines 2—2 in FIG. 1.

Referring now to FIG. 2, in which like elements of the temperature control structure system 12 in FIG. 1 are provided having like reference designations, the structure 12 has a device under test 50 disposed on the seating surface 26. With the device in place, the heating/cooling region 29 becomes a closed cavity into which gas and light (e.g. a laser beam) can be introduced through the apertures 20. In this particular example, the device 50 includes contact points in the form of a ball grid array provided from a plurality of balls 51 disposed on the surface of the device 50 and through which electrical connections are made to the electrical devices and components included within the device 50.

Disposed over the device 50 is tester 52 having a plurality of test probes 54. For clarity, only a portion of the tester 52 is shown in FIG. 2. The test probes 54 are in physical and electrical contact with the electrical contacts 51 of the device 50. The tester probes 54 provide a force on the device 50 through the contacts 51 sufficient to retain device 50 on the seating surface 26 while the expanding gases impinge upon the surface of the device 50 exposed to the heating/cooling region 29. It should be noted that this design allows contact to be made to the balls 51 using probes 54 or any other electrical leads which relatively short. Thus good electrical contact can be made between the device 50 and the tester 52.

The tapered upper surfaces 24 of the sidewalls 22 help guide and locate the device 50 onto the seating surface 26 such that portions of the bottom surface of the device 50a are flush against the seating surface 26. Thus when a vacuum is drawn through the vacuum tube 32, a vacuum force can be generated to urge or hold the device 50 onto the seating surface 26. Furthermore, by providing the top surface 36 of the vacuum tube 32 slightly below elevation of the seating surface 26, the vacuum hole 32 can act as a drain to the expanding cooling gasses that will enter the region 29 via apertures 20. Alternatively, in cases where the vacuum tube 32 cannot act as a drain for the expanding gasses (e.g. because the tube 32 is not below the plane defined by the seating surface 26), one or more escape paths 33 can be provided in the sidewalls 22 of the structure 12 to allow gas to escape from the region 29. Here two escape paths 33 are shown but those of ordinary skill in the art will appreciate that any number of paths or openings sufficient to allow gas to escape from region 29 can be used.

Each of the optically clear ports 12a–12h provide openings to first ends of corresponding channels 40a–40h. Disposed in first ends of each of the channels 40a–40h is a clear sealing window 52a–52h and disposed in second ends of the channels 40a–40h are clear sealing windows 57a–57h. A top surface of the windows 57a–57h form the bottom surface of the recess regions 44 (FIG. 1). In this particular example, since the laser source 14 (FIG. 1) directs light into the channels 40a–40h from an external laser source, each of the clear sealing windows 52 is provided as an optically clear plug which provides a gas tight seal in the first ends of channels 40a–40h. The clear windows 57a–57h disposed in the second ends of the channels 40a–40h have openings 56a–56h which lead to the apertures 20a–20h. It should be noted that only two channels 40a, 40e are shown in FIG. 2.

As can be seen in FIG. 2, the openings 56a–56h in optically clear plugs 57a–57h include narrowing regions 58 which lead to a reduced size path 59 which together form a nozzle structure 60. The nozzle structure 60 causes the gas to form a jet stream which exits the apertures 20a–20h into the heating/cooling region 29. Thus, a jet stream of gas passes through expanding orifices 56a–56h and out apertures 20a–20h.

Each of the gas ports 12a–12h provide openings to first ends of corresponding gas channels 54a–54d. Each of the gas channels includes a path which leads to predetermined ones of the apertures 20a–20h. It should be noted that only gas channels 54a, 54e are shown in FIG. 2. It should be noted that although the size and/or shapes of the channels 54a–54h are all shown to be the same in FIG. 12 the size and shape of each of the channels 54a–54h need not be the same. For example, advantageous temperature control characteristics may be achieved in a particular application by providing channels 54a–54h having different sizes and/or shapes. In this case, the size, shape and/or pointing direction of each nozzle 60 could be selected to provide a particular cooling characteristic.

At least a portion of each of the one or more channels 40a–40h intersect with at least a portion of one of the gas channels 54a–54d. As shown in FIG. 2, for example, channels 40a and 40e intersect gas channels 54a, 54d, respectively, such that gas fed through the first port of gas channels 13c, 13d travels through the openings 56a–56h in clear windows 57a–57h and can exit through the expanding gas apertures 20a, 20e, exposed to the heating/cooling region 29. The clear plugs 52a–52h disposed in the ends of the passages or channels 40 prevent gas from exiting the second end the channels 40a–40h.

The diameters of the ports 12a–12h, 13a–13d, channels 40a–40h, gas channels 41a–41 and apertures 20a–20h are selected in accordance with a variety of factors including but not limited to the particular size of the device, the range of temperatures to which the device is to be exposed, the accuracy to which a device must be held to a particular temperature within the range of temperatures, available gas flow rates and pressures to feed to the system and the available laser power. The size and shape of the vacuum port 32 is also selected in accordance with a variety of factors including but not limited to the force required to hold the device to the surface 26 as the device is being moved from one location to another location via a robot arm, for example. Such movement can result in significant forces on the device caused by acceleration and deceleration of a robot arm or other transport structure.

The gas source 16 (FIG. 1) supplies gas at a pressure sufficient to cool a device through the gas ports 13a, 13b, 13c, and 13d. The gas travels upwards through gas channels 54a–54d, (only channels 54a and 54d are visible in FIG. 2) and a total of four such channels (one for each gas port) are present in FIG. 1. The gas introduced into the gas channels 54 cannot escape out the bottom of the channels 40, because of optically clear plugs 52a–52h.

As the gas exits the apertures 20a–20h, the gas expands in the region 29 and rapidly cools while directly impinging on the surface of the device 50. This results in a heat transfer coefficient which is believed to be relatively high compared with heat transfer coefficients which can be achieved by conduction through any solid or liquid as is done in prior art techniques.

To regulate the cooling, or to provide heating, the laser source 14 (FIG. 1) produces laser beams which pass through the optically clear windows 52a–52h and the optically clear expanding orifices 56a–56h to impinge on a surface 50a of the device 50 in substantially the same region as the expanding gas. The result is direct impingement of intermingled or coaxial heating and cooling sources.

The use of an impinging jet stream of gas can result in a heat transfer coefficient which is higher than that which can be obtained by a flow parallel to the underside of the device 50. In addition, the use of an expanding orifice to take advantage of the thermodynamic property of expanding gasses results in a localized cooling effect. This, in turn, results in a rapid thermal response. It should be noted that the gas supplied by the gas source 16 (FIG. 1) can be delivered at an ambient temperature or the gas can be cooled and delivered to gas ports 13a–13d (FIG. 1) at a temperature which is lower than ambient temperature (e.g. a relatively cool temperature).

The direct impingement design of the present invention eliminates axially directed thermal resistance paths between the heating and cooling sources. Since there is no axially directed thermal resistance path between the cooling and heating sources, the system is provided having a relatively rapid thermal response time and there is no region of possible thermal fatigue due to repeated heating and cooling of mechanical structures.

Although the nozzle/jet structures are here shown provided in the base of the temperature control structure 12, it should be appreciated that in some embodiments is may be desirable or necessary to orient the nozzle/jet structures differently than here shown. The nozzle/jet structures can be oriented in any manner without departing from the spirit and scope of the invention provided that direct impingement of intermingled heating and cooling sources is provided.

All references cited herein are hereby expressly incorporated herein by reference in their entirety.

Having described preferred embodiments of the invention, it will now become apparent to one of ordinary skill in the art that other embodiments incorporating their concepts may be used.

For example, in some applications it may be desirable to raise the height of the vacuum structure 32 above the seating surface 26 such that the device is disposed on the top surface 36 of the vacuum tube 32. In this case, the vacuum escape tubes 33 may not be required and the device could be properly aligned before being picked up by the temperature control structure and placed in contact with a tester. Alternatively, the tester could be provided having an alignment structure to ensure that the device is properly aligned against the tester.

Also, the seating surface 26 may be provided having different shapes. For example, if a perimeter edge of a device under test corresponds to regions of particular heat generation or temperature variation, then the seating surface could be provided having a shape such that the device under test is substantially or fully supports in a central region thereof to thus leave exposed the perimeter regions of the device. In this manner the expanding gases and laser energy can impinge directly upon those perimeter regions of the device which correspond to regions of heat generation or temperature variation in the device under test. With this approach, the cooling gases and heating laser can be directed at the region of interest to thus better control the temperature of the device.

Similarly, since devices themselves can have particular regions of temperature extremes (i.e. so-called "hot spots" or "cold spots"), the direction of the gas jet streams and the laser beams can be selected such that expanding gases and/or laser beams impinge particular regions of a device. One way in which the directions of the gas jets and laser beams can be changed is to provide the channels 40 or the portion of the channels 40 which open to the region 29 at an angle which is not normal to the surface of the device.

It is felt therefore that these embodiments should not be limited to disclosed embodiments, but rather should be limited only by the spirit and scope of the appended claims.

The invention claimed is:

1. A method for controlling the temperature of a device comprising:
   providing a body having a heating and cooling region and having a seating surface capable of accepting the device, the seating surface disposed in the heating and cooling region of said body;
   heating the device by propagating energy through a heating channel, the heating channel being disposed in said body with a first end of said heating channel exposed to the heating and cooling region in said body, wherein the energy impinges on the device; and
   cooling the device by propagating a cooling fluid through a cooling channel, the cooling channel being disposed in said body with a first end of said cooling channel exposed to the heating and cooling region in said body, wherein the cooling fluid impinges on the device.

2. The method of claim 1 wherein said heating further comprises providing a heating source at a second end of said heating channel.

3. The method of claim 2 wherein said cooling further comprises providing a cooling source at a second end of said cooling channel.

4. The method of claim 3 further comprising operating said heating source to provide heat through said heating channel and into said heating and cooling region.

5. The method of claim 4 wherein operating said heating source comprises operating a laser to provide heat through said heating channel.

6. The method of claim 4 further comprising operating said cooling source to provide the cooling fluid through said cooling channel and into said heating and cooling region.

7. The method of claim 6 further comprising disposing said heating channel and said cooling channel in said body such that the heat propagating in said heating channel is intermingled with cooling fluid propagating in said the cooling channel.

8. The method of claim 6 wherein operating said cooling source to provide the cooling fluid comprises operating said cooling to provide one of a cooling gas and a cooling liquid.

9. The method of claim 1 wherein the energy propagating through said heating channel and the cooling fluid propagating through said cooling channel impinge on the device in substantially the same region of the device.

10. The system of claim 9 wherein providing the body further comprises providing a guiding structure for accurately guiding the device into a particular location on the seating surface.

11. The method of claim 1 further comprising retaining the device on the seating surface of the body.

12. The method of claim 11 wherein retaining the device comprises using a vacuum structure.

* * * * *